United States Patent [19]

Truitt et al.

[11] Patent Number: 4,713,159
[45] Date of Patent: Dec. 15, 1987

[54] COMPACT AND CLEANABLE APPARATUS FOR PREVENTING SCALE FORMATION IN LIQUID SYSTEMS

[75] Inventors: Robert B. Truitt, West Lafayette; V. Bruce Junius, Lafayette, both of Ind.

[73] Assignee: Fluid Mechanics, Lafayette, Ind.

[21] Appl. No.: 860,746

[22] Filed: May 7, 1986

[51] Int. Cl.[4] .............................................. C23F 13/00
[52] U.S. Cl. .................................. 204/197; 204/148; 204/149; 204/150
[58] Field of Search ................ 204/147, 148, 149, 150, 204/196, 197

[56] References Cited

U.S. PATENT DOCUMENTS

| | | | |
|---|---|---|---|
| 2,893,938 | 7/1959 | Bremerman | 204/196 |
| 3,342,712 | 9/1967 | O'Keefe | 204/197 |
| 3,425,925 | 2/1969 | Fleischman | 204/197 |
| 3,448,034 | 6/1969 | Craft et al. | 204/197 |
| 3,486,999 | 12/1969 | Craft | 204/197 |
| 3,595,774 | 7/1971 | Bremerman | 204/196 |
| 3,660,264 | 5/1972 | Schuller | 204/197 |
| 4,147,607 | 4/1979 | Vollman | 204/196 |

Primary Examiner—T. Tung

Attorney, Agent, or Firm—Woodard, Emhardt, Naughton Moriarty & McNett

[57] ABSTRACT

A device for eliminating mineral precipitation within a liquid system. A container having inlet and outlet pipes is connectable to external plumbing to receive and pass through the container untreated water or liquid. The inlet pipe is connected within the container to a fitting having a treatment pipe extending therebeneath to the bottom of the container. A metal treatment bar is suspendedly positioned within the treatment pipe, but is spaced internally therefrom to allow the untreated water to contact and pass over the treatment bar eventually emptying into the container. The water exiting the treatment pipe eventually exits the container through the outlet pipe. The treatment bar is fixedly and suspendedly mounted by a rod extending out of the container and secured to a plug sealingly, but removably mounted to the container top wall. The plug is removable along with rod and treatment bar to facilitate cleaning of the bar. A pressure relief valve is mounted to the container top wall to allow for manual release of pressure. Valves are provided on the inlet and outlet pipes in conjunction with a by-pass valve extending therebetween to prevent flow of liquid to the container when the treatment bar is removed for cleaning.

5 Claims, 6 Drawing Figures

U.S. Patent  Dec. 15, 1987  Sheet 1 of 2  4,713,159
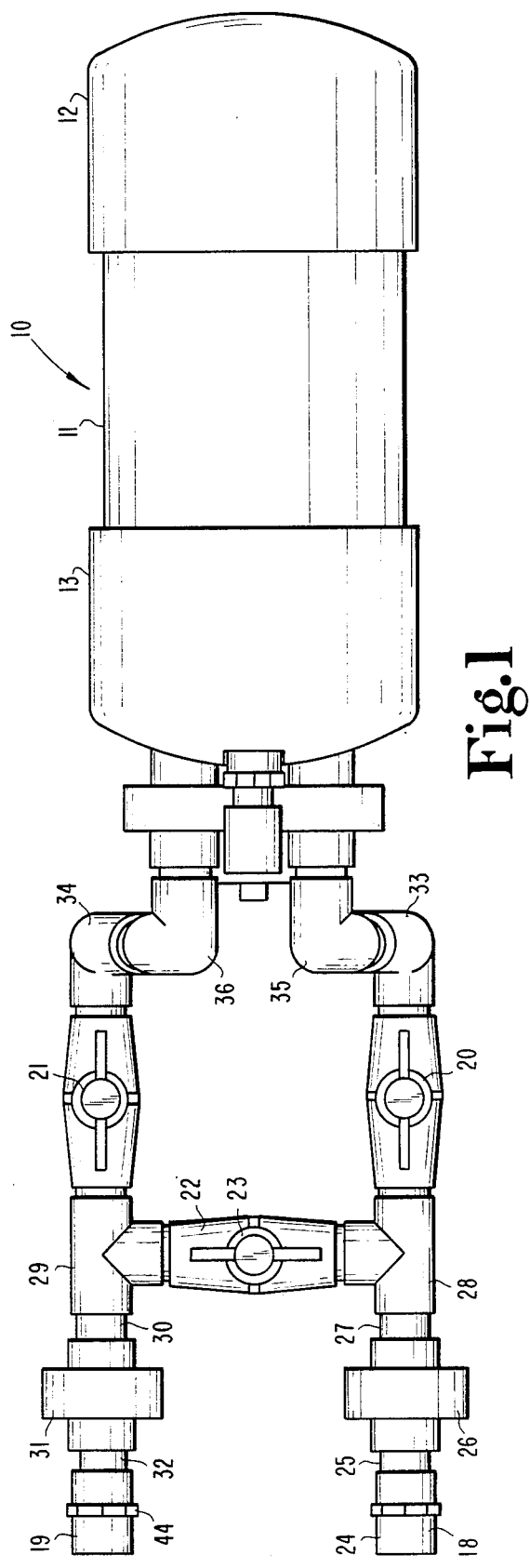
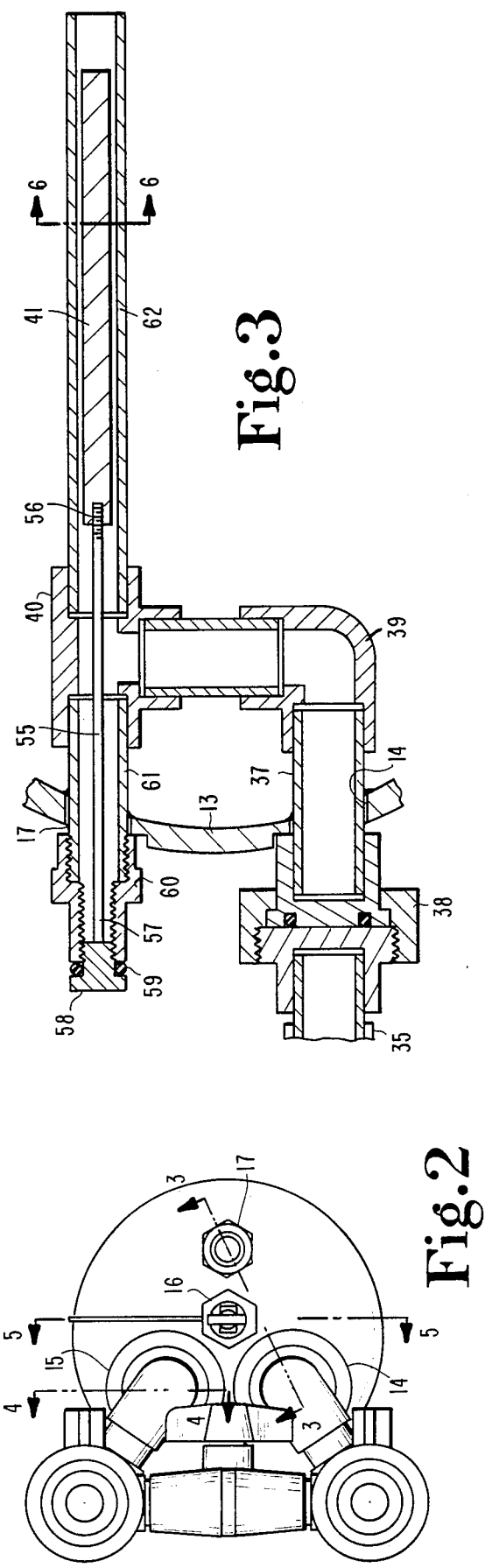

COMPACT AND CLEANABLE APPARATUS FOR PREVENTING SCALE FORMATION IN LIQUID SYSTEMS

BACKGROUND OF THE INVENTION

This invention is in the field of devices for stabilizing liquids and preventing build-up of scale within liquid systems. In various types of fluid systems including those designed to convey oil and/or water, undesirable scale build-up occurs within the pipes as well as any mechanisms located within the conveyance system. Water which contains dissolved calcium, referred to as "hard water", can cause major maintenance problems in a home as well as add substantially to the operating cost of the home. Further, hard water that is not conditioned increases the difficulty of washing clothes requiring both more soap and fabric softener. A variety of other problems exist in the home with hard water such as bathtubs and toilet bowls being difficult to keep clean, dishwashers that do not operate effectively as well as skin irritation. To solve these aforementioned problems, most households are equipped with water softeners that are either purchased or leased.

Technology developed in the 1960's provides a better alternative to the utilization of a water softener at a substantially lower price. Such a water conditioning system utilizes a stabilizer bar which is in contact with the untreated water. The bar is mounted directly in the hard water stream causing a restriction of flow and a small pressure drop. Calcium within the water adjacent the bar is attracted to precipitate on the bar because the surface of the bar duplicates the crystal form that the calcium would naturally assume when it precipitates. As a result, tiny "calcite" seeds form on the bar surface. Some of these seeds are flushed off the bar by the force of the flowing water. The seeds are very stable and very active in their need to grow larger and as a result, they attract calcium in the environment to achieve the growth. The result is a natural water that is not changed chemically, but is physically altered so that it lathers better and tastes better. This entirely natural phenomenon is referred to as "epitaxial nucleation". The practical result is that the high particle activity eliminates lime formation in the pipes and mechanisms associated with the pipes thereby gradually eliminating existing lime deposits in the water system.

U.S. Pat. No. 3,448,034 issued to Craft, et al. discloses a stabilizing element having a core arranged essentially within a housing which provides a flow conduit for various liquids. The liquids contact the stabilizing core resulting in polarization of the liquids thereby preventing precipitation of minerals within the liquid from being deposited on the tubing walls. A similar device shown in U.S. Pat. No. 3,486,999 issued to Craft discloses an apparatus for preventing scale formation in water systems which includes an anodic core in contact with the water thereby polarizing the water and eliminating the precipitation of salts therefrom.

The prior water or liquid treatment systems utilizing a treatment bar as contrasted to a water softening type of device typically require a relatively long length of outlet pipe extending aft of the treatment bar. Such a length of outlet pipe, for example 30 feet, provides sufficient time for the water to react after passing over the bar to achieve the anti-scale result. In relatively small buildings, the requirement for the 30 feet of pipe is burdensome and undesirable. Disclosed herein is a water treatment system which utilizes a 1½ gallon container having the treatment bar located therein. The size of the container is sufficient to eliminate the necessity of an extensive length of pipe aft of the treatment bar.

The prior devices have a further disadvantage in that the treatment bar is typically mounted within a pipe requiring extensive effort for the removal of the treatment bar during periodic cleaning and maintenance. Such a treatment bar must be periodically cleaned at least on a monthly basis to remove surface build-up and to provide a fresh bar surface for contact with the incoming untreated liquid. Disclosed herein is a water treatment device which is designed to allow very quick and easy removal of the treatment bar for cleaning purposes.

SUMMARY OF THE INVENTION

One embodiment of the present invention is a liquid treatment apparatus comprising a container for holding liquid having an inlet and an outlet, inlet means mounted to the inlet of the container for routing untreated liquid into the container, outlet means mounted to the outlet of the container for routing treated liquid out of the container, and, treatment means associated with the inlet means being operative to treat the untreated liquid and including a metal bar in contact with the untreated liquid prior to release into the container, and, holding means for removably holding the bar in the container but allowing removal of the bar therefrom for cleaning thereof.

A second embodiment of the present invention is an apparatus for stabilizing water comprising a container for holding water and having an inlet for receiving untreated water and an outlet through which treated water may flow from the container, inlet pipe means mounted to the inlet and extending into the container having a bottom end, outlet pipe means mounted to the outlet, sleeve means mounted to and sealingly extending out of the container and having a removable external cap, and, treatment means suspendedly mounted in the container having a conduit connected to the bottom end of the inlet pipe means to receive the untreated water therefrom and further including a metal treatment member removable through the the sleeve means once the cap is removed, the conduit circumferentially surrounding the metal treatment member with the member having surfaces exposed to the untreated water passing through the conduit.

It is an object of the present invention to provide a new and improved device for preventing scale formation in water systems.

A further object of the present invention is to provide a new and improved fluid stabilizer.

In addition, it is an object of the present invention to provide a compact water scale preventer.

Further, it is an object of the present invention to provide an easily cleaned and maintained water scale preventer.

Related objects and advantages of the present invention will be apparent from the following description.

BRIEF DESCRIPTION OF THE DRAWINGS

FIG. 1 is a side view of the water treatment apparatus incorporating the present invention.

FIG. 2 is a top view of the apparatus of FIG. 1.

FIG. 3 is an enlarged fragmentary cross-sectional view taken along the line 3—3 of FIG. 2 and viewed in the direction of the arrows.

DESCRIPTION OF THE PREFERRED EMBODIMENT

Figure 6:
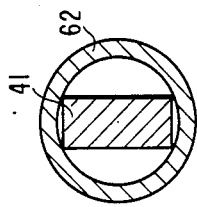
FIG. 6 is an enlarged cross-sectional view taken along the line 6—6 of FIG. 3 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the water treatment apparatus incorporating the present invention. The apparatus includes a cylindrical hollow container 10 for holding approximately 1½ gallons of water which in one embodiment is produced from a PVC pipe 11 sealingly mounted at its opposite ends to a PVC bottom cap 12 and a PVC top cap 13. In the particular embodiment shown in the drawing, pipe 11 has a 6 inch diameter and is approximately 12 inches long. Likewise, caps 12 and 13 each have a 6 inch inside diameter being sealingly joined to the outer cylindrical surface of pipe 11. Cap 12 completely seals the bottom of the container whereas the top cap 13 has four apertures extending therethrough. Two of the apertures 14 and 15 (FIG. 2) provide, respectively, an inlet for the untreated water to flow into the container and an outlet for the treated water to flow out of the container. The third aperture 16 receives a pressure relief valve whereas the fourth aperture 17 provides the means for removal of the water treatment bar.

A pair of pipe configurations 18 and 19 are connected and mounted, respectively, to the water inlet 14 and water outlet 15 of the container. Each is provided with a conventional shut-off valve 20 and 21 with a by-pass pipe 22 extending therebetween. A third cut-off valve 23 is provided in by-pass pipe 22. Pipe 18 has a double ended female fitting 24 with the free end connectable to the water inlet pipe of the building. The opposite end of fitting 24 is connected to a short length of pipe 25 in turn extending sealingly into a PVC pipe union fitting 26 receiving at its opposite end a second short length of pipe 27 in turn extending sealingly into a T-shaped fitting 28. A second T-shaped fitting 29 is connected sealingly to a short length of pipe 30 in turn extending sealingly into a PVC union 31 which has at its opposite end extending sealingly therein a short length of pipe 32 in turn sealingly mounted to the bottom female end of fitting 44. The opposite end of fitting 44 is reconnected to the building water pipe.

By-pass pipe 22 extends between and is sealingly mounted to the mutually opposed openings of T-fittings 28 and 29. A conventional compact ball valve 23 is provided in by-pass pipe 22. With valve 23 in the open position and valves 20 and 21 in the closed position, the water from the building water inlet pipe extends into coupling 24 through by-pass pipe 22 and out coupling 44 to the end user thereby by-passing the water treatment mechanism within container 10. With valve 23 in the closed position and valves 20 and 21 in the open position, the water flowing into coupling 24 is routed into the water treatment container wherein the water is caused to pass over the water treatment bar and then eventually out through coupling 44 to the end user.

Valves 20 and 21 are identical to valve 23 and are sealingly connected at one end by means of a short length of pipe to T-shaped fittings 28 and 29, respectively. The opposite ends of the main body of valves 20 and 21 are sealingly connected by means of a short length of pipe to a pair of elbow fittings 33 and 34, respectively, in turn sealingly connected by means of additional short lengths of pipe to elbow fittings 35 and 36, respectively.

A short length of PVC pipe 37 (FIG. 3) extends sealingly through inlet aperture 14 of cap 13 and is connected sealingly to union fitting 38 in turn sealingly joined by means of a short length of pipe to elbow fitting 35. The end of pipe 37 located within the container is sealingly joined to elbow fitting 39 in turn sealingly joined by means of a short length of pipe to a T-shaped fitting 40. The untreated water flowing into coupling 24 is thereby routed eventually into fitting 40 whereat the water eventually passes over treatment bar 41 and empties into the container.

Figure 4:
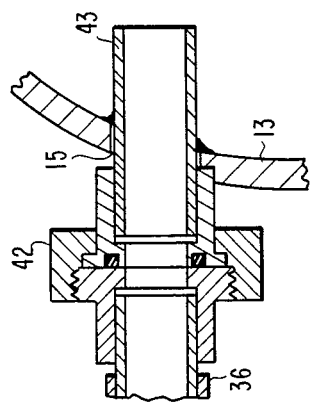
FIG. 4 is a enlarged fragmentary cross-sectional view taken along the line 4—4 of FIG. 2 and viewed in the direction of the arrows.

Elbow 36 (FIG. 4) is connected by a relatively short length of pipe to a union coupling 42 in turn sealingly joined to the top end of a short length of pipe 43 which extends sealingly through outlet aperture 15 of cap 13. The bottom end of pipe 43 is positioned within the container, but immediately adjacent the cap thereby necessitating that the container be filled with water to force the treated water through pipe 43 and eventually via coupling 44 into the main water supply.

Figure 5:
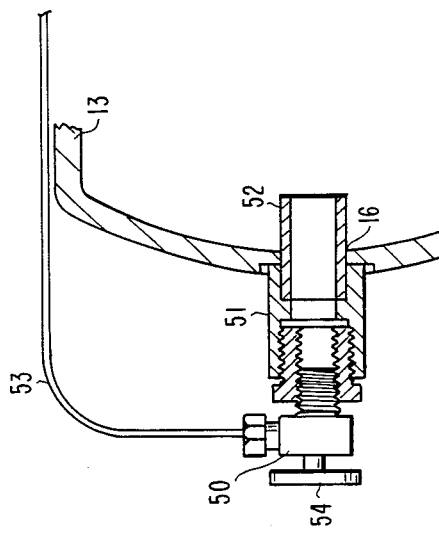
FIG. 5 is an enlarged fragmentary cross-sectional view taken along the line 5—5 of FIG. 2 and viewed in the direction of the arrows.

A conventional pressure relief valve 50 (FIG. 5) is sealingly mounted and extends into the top female end of coupling 51 which has a bottom female end sealingly receiving a short length of pipe 52 extending sealingly through aperture 16 and cap 13. Pipe 52 has a bottom end located within the container, but immediately adjacent the cap. A drain tube 53 is mounted to the outlet of valve 50 having a manually operable member 54 which may be rotated to open thereby releasing pressure within the container and allowing the pressurized water and air to escape into the atmosphere via drain tube 53. The drain tube extends downwardly along the outside of the container.

Holding means is provided for removably holding the treatment bar 41 in the container and allowing removal of the bar therefrom for cleaning purposes. The holding means includes a brass rod 55 (FIG. 3) with a bottom end 56 threadedly secured to the top end of bar 41. The top end 57 of rod 55 is secured to a headed plug 58. The plug is threaded into coupling 60 having an internally threaded top end and bottom end sealingly mounted to a short length of pipe 61. An O-ring 59 rests atop coupling 60 beneath the head of cap 58. Cap 58 and coupling 60 are brass. Pipe 61 extends sealingly through aperture 17 of cap 13 and has a bottom end fixedly secured to one end of the T-shaped coupling 40. The mutually opposed opposite end of coupling 40 is fixedly secured to the top end of a relatively long length of pipe or conduit 62. The bottom end of pipe 62 terminates immediately beneath the bottom end of treatment bar 41 and opens into the container allowing the water flowing past bar 41 to empty into the container. In one embodiment, pipe 62 has a length of 9 inches thereby placing the bottom end of pipe 62 near the bottom of the container or within cap 12. Rod 55 extends centrally through coupling 60, pipe 61 and T-shaped coupling 40, being affixed to the top end of treatment bar 41 which is centrally located within pipe 62. In one embodiment, bar 41 has an approximate length of 6¾ inches with a rectangular cross-section of ¼ inch by 5/16 inches. Pipe 62 has an inside diameter equal to or slightly larger than the width of the bar 41 thereby allowing the untreated water entering T-shaped coupling from elbow coupling 39 to pass downwardly around bar 41 between the bar and the interior surface of pipe 62. In the same embodiment, the inside diameter of pipe 62 is approximately 0.6 inches. The treatment bar occupies approximately 60 to 80 percent of the internal volume of the pipe 62 depending upon the hardness of the water and is in contact with the inside surface of the pipe at the four longitudinally extending edges of the bar (FIG. 6). In order to remove bar 41, cap 58 is rotated thereby unthreading the cap from coupling 60 until rod 55 with the attached bar 41 may be pulled upwardly out of the container. Prior to removing plug 58, valves 20 and 21 are turned to the closed position whereas valve 23 is turned to the open position. Likewise, member 54 of valve 50 may be opened releasing water pressure within the container. Once removed, the bar may be cleaned by scraping the surface residue therefrom with an abrasive pad providing a fresh clean exterior surface on the bar. The bar is then reinserted down into the container and within pipe 62 with plug 58 then being rotated and tightened onto coupling 60. Valves 20 and 21 are then opened and valve 23 is closed.

Pipe 62 is produced from PVC or other suitable plastic or metal whereas treatment bar 41 is produced from a metal alloy which contains the elements Cu, Ni, Zn, Pb, Sn, Fe, Sb and S. The metal alloy can be described roughly as a version of nickel silver, or German silver, and will exhibit a high resistance to corrosion. The mixture of elements results in at least two solid solutions. On a microscopic level, the core surface is divided into domains corresponding, for example, to nickel or a Ni-Cu system and a system composed of the other elements. The theory of operation of such a water treatment bar is known as well as are the specific formulations known as disclosed for example, in the U.S. Pat. Nos. 3,448,034 issued to Craft et al. and 3,486,999 issued to Craft, both of which are hereby incorporated by reference.

Many advantages of the device disclosed herein are provided as compared to the typical water softening system. For example, the expense and trouble of salt supply is eliminated while providing water with most of the properties of soft water. Scale build-up in plumbing and heaters is eliminated along with the slippery feel in bathing associated with softened water. Lime deposits on shower walls and fixtures are eliminated while providing superior results in lawn and houseplant watering. The taste and odor of most water is improved. The easy removal of the stabilizer bar 41 allows the owner to easily maintain the device by simply removing the bar every three to four weeks and scrubbing the bar with an abrasive pad. Such maintenance requires typically five minutes. An additional advantage of the device disclosed herein is that the calcium content of water is maintained which is desired for good health and does not require the introduction of sodium. Soap and detergent consumption is reduced as compared to untreated hard water providing completely for a non-polluting conditioning system and less injury to clothing due to detergents. The lathering properties are much superior to unstabilized hard water.

Most importantly, the device disclosed herein is very compact and easy to install in a main water supply line requiring no moving parts nor consumption of energy. A typical prior water stabilizer system required approximately 30 feet of outlet pipe to extend aft of the stabilizer bar to provide sufficient reaction of the treated water prior to consumption. Through the use of the 1½ gallon container disclosed herein, the need for such a 30 foot length of outlet pipe is eliminated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Apparatus for stabilizing water comprising:
   a container for holding water and having an inlet for receiving untreated water and an outlet through which treated water may flow from said container:
   inlet pipe means mounted to said inlet and extending into said container with said inlet pipe means having a bottom end;
   outlet pipe means mounted to said outlet;
   sleeve means mounted to and sealingly extending out of said container at a location separate from said inlet pipe means and said outlet pipe means, said sleeve means having a removable external cap; and,
   treatment means suspendedly mounted in said container having a conduit connected to said bottom end of said inlet pipe means to receive said untreated water therefrom and further including a metal treatment member removable through said sleeve means once said cap is removed, said conduit circumferentially surrounding said metal treatment member with said member having surfaces exposed to said untreated water passing through said conduit, and wherein;
   said conduit is suspendedly mounted within said container and is in liquid communication with said inlet pipe means to receive all of said untreated water therefrom, said metal member is located within said conduit and has a plurality of longitudinally extending edges in contact with said conduit forming a plurality of separate passages between said metal member and said conduit extending the length of said metal member and through which said untreated water passes contacting said metal member prior to exiting said conduit into said container, all of said untreated water being adapted to contact said metal member and flow in one direction along the entire length thereof prior to release into said container.

2. The apparatus of claim 1 and further comprising:
   brass extension means fixedly fastened between said cap and said metal member allowing removal of said extension means and said member for cleaning when said cap is removed from said container, said metal member having a top end connected to said brass extension means with said top end positioned beneath said bottom end of said inlet pipe means to allow all of said untreated water to contact said metal bar along the entire length thereof.

3. The apparatus of claim 2 wherein said metal member is an alloy including copper, tin, iron, lead, zinc and nickel.

4. The apparatus of claim 3 and further comprising:
manually operable pressure relief means mounted to said container at a location separate from said inlet pipe means, said outlet pipe means and said sleeve means and operable to release liquid pressure within said container prior to removal of said metal member; and,
valve means connected to said inlet pipe means and said outlet pipe means being operable to limit liquid flow into and out of said container and to by-pass liquid flow around said container prior to removal of said member.

5. The apparatus of claim 4 and further comprising:
a T-shaped fitting coupling said inlet pipe means with said treatment means to route all of said untreated liquid to said metal member and being connected to and between said sleeve means and said conduit with said extension means and said member being movable though said T-shaped fitting upon removal and re-installation of said cap.

* * * * *